March 19, 1946.   F. NALLINGER ET AL   2,396,745
MULTIPLE MOTOR DRIVING MECHANISM FOR
AIRCRAFT WITH ADJUSTABLE PROPELLER
Filed Nov. 4, 1939   2 Sheets-Sheet 1

Fritz Nallinger
Albert Friedrich
INVENTORS

BY
ATTORNEY

March 19, 1946.   F. NALLINGER ET AL   2,396,745
MULTIPLE MOTOR DRIVING MECHANISM FOR
AIRCRAFT WITH ADJUSTABLE PROPELLER
Filed Nov. 4, 1939   2 Sheets-Sheet 2
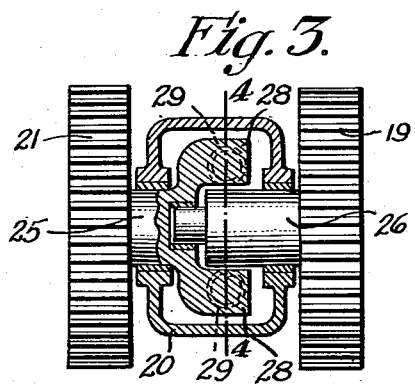
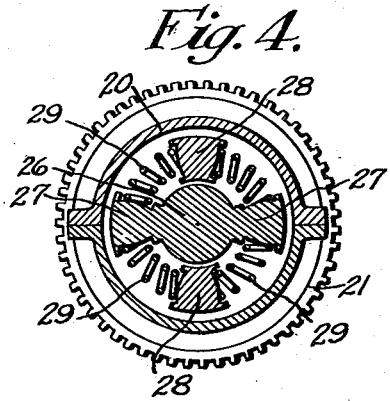
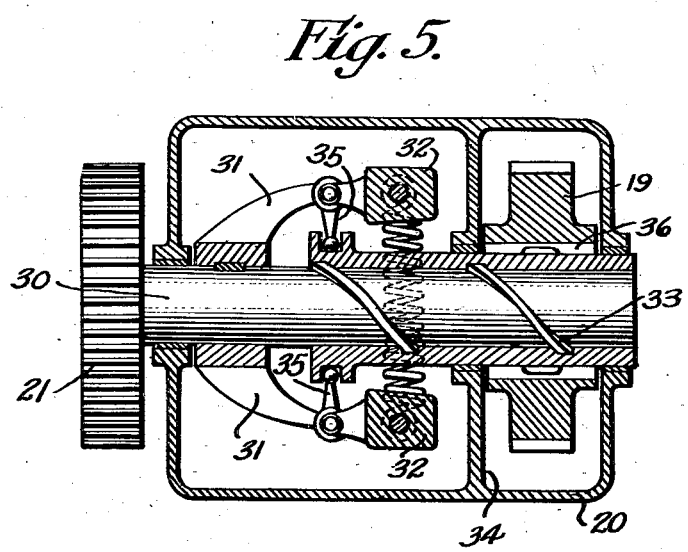
INVENTORS
FRITZ NALLINGER
ALBERT FRIEDRICH
BY
ATTORNEY.

Patented Mar. 19, 1946

2,396,745

UNITED STATES PATENT OFFICE 2,396,745

MULTIPLE MOTOR DRIVING MECHANISM FOR AIRCRAFT WITH ADJUSTABLE PROPELLER

Fritz Nallinger, Stuttgart, and Albert Friedrich, Stuttgart-Bad Cannstatt, Germany; vested in the Alien Property Custodian Application November 4, 1939, Serial No. 302,870
In Germany November 1, 1938

10 Claims. (Cl. 170—135.6)

This invention relates to multiple motor driving mechanism, especially although not necessarily for aircraft, wherein one or more adjustable propellers and controlling mechanism therefor are involved, and wherein the several motors drive a common shaft in such a way that whenever one or more of the motors fail the propellers or the like continue to be driven by the remaining active motor or motors, the primary object of the invention being to provide a practical, relatively simple, and reliable arrangement of this character which increases the safety of flight of multi-engined airplanes and the like.

Other important objects and advantages of the invention will be apparent from the following description and the appended drawings, wherein two merely illustrative examples of the invention are set forth.

In the drawings:

Figure 3 is an axial section taken through one form of pitch control mechanism.

Figure 4 is a transverse section taken on the line 4—4 of Figure 3.

Figure 5 is an axial section taken through another form of pitch control mechanism.

Figure 1:
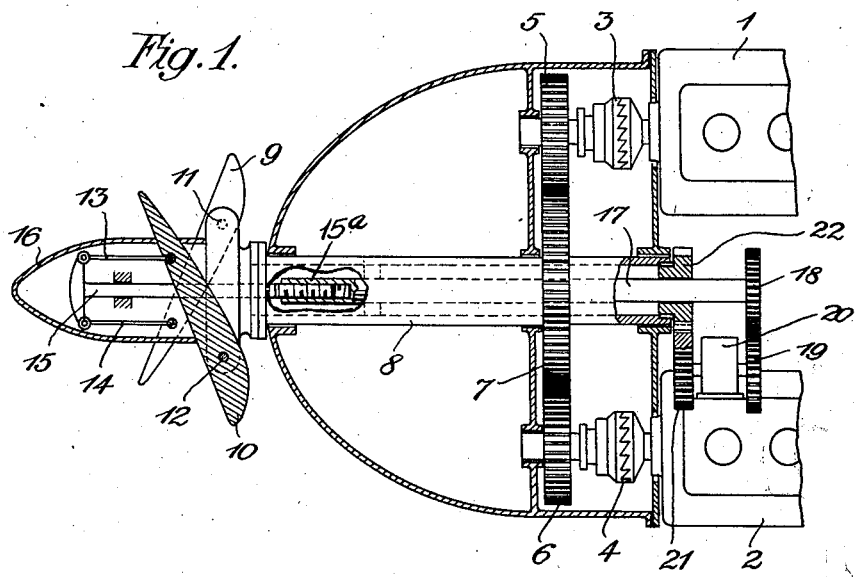
Figure 1 is longitudinal sectional view taken through an embodiment of the invention, in which the pitch control mechanism is mechanically actuated.

Referring in detail to the drawings, the several motors 1 and 2 drive the propeller shaft 8 through claw clutches 3 and 4, respectively, and related gearings 5, 6 and 7. On the propeller shaft 8 are mounted two adjustable propeller blades 9 and 10 adjustably rotatable on the axes of the shafts 11 and 12 and adjustable by means of the rods 13 and 14, respectively. These rods are connected to a T-shaped piece 15 slidable longitudinally in the propeller hub 16. The inner end 15a of the T-piece 15 is threaded in the bore in the forward end of the shaft 17, the rods 13 and 14 being connected to the arms of the crosshead of the T-piece, so that when the shaft 17 is turned it adjusts the T-piece and hence the propeller blades in a direction corresponding to the direction of rotation of the shaft 17.

The rearward end of the shaft 17 extends beyond the rear end of the propeller shaft 8 and has a pinion 18 meshed with a driving pinion 19 of a power or revolution controller 20 which is driven by a gearwheel 21 meshed with a gear 22 fixed on the propeller shaft.

As shown in Figure 3, the gearwheel 21 is fast on a shaft 25, and the pinion 19 is fast on a shaft 26, the innermost end of the latter being supported in a corresponding axial bore of the shaft 25. The shaft 26 comprises two radially projecting arms 27, and the shaft 25 is provided with the two similar arms 28 which are angularly offset by 90° relative to the arms 27 and project into the spaces between the latter. Springs 29 are inserted between adjacent arms 27 and 28 to hold said arms resiliently at predetermined distances from one another while providing a resilient coupling between the shafts 25 and 26 and thereby between the gearwheels 21 and 19.

A controller of this type operates as follows in the arrangement illustrated in Figure 1 of the drawings:

As apparent in Figure 1, the gearwheels 22 and 18 have the same diameter and the gearwheels 21 and 19 are of the same diameter, so that the shaft 17 rotates uniformly and synchronously with the propeller shaft 8. The springs 29 then effect a certain equilibrium between the shafts 8 and 17, whereby a predetermined pitch angle is obtained for the propeller blades 9 and 10. If the resistance at the propeller blades increases, so that the propeller tends to reduce the speed of rotation of the propeller shaft and driving motors, the growing back pressure at the springs 29 causes a relative displacement between the shafts 25, 26 and gearwheels 21 and 19, and a corresponding relative adjustment of the auxiliary shaft 17 to the propeller shaft 8. This latter relative adjustment results in the T-member 15 being pulled rearwardly whereby the blade pitch is reduced.

In the embodiment shown in Figure 5 of the drawings, the gearwheel 21 is arranged on a shaft 30, the latter carrying a centrifugal governor 31 having weights 32. The shaft 30 is further provided with helical guide ribs 33. A sleeve 34 is arranged on the shaft 30 and this sleeve can be axially displaced on the shaft 30 by means of the arms 35 of the weights 32, and, owing to the helical ribs cooperating with corresponding grooves in the sleeve 34, said axial displacement causes a corresponding angular displacement between shaft 30 and sleeve 34. The gearwheel 19 is mounted on the sleeve 34 axially displaceably but secured against rotation by means of the keys 36. The gearwheel 19 is in mesh with the gearwheel 18, which may project through a suitable aperture into the chamber of the controller housing 20 containing the gearwheel 19.

The device as a whole operates as follows:

With falling speed of rotation the weights 32 approach one another and shift the sleeve 34 toward the left, simultaneously rotating the sleeve through a predetermined angle relative to the shaft 30. The gearwheel 19 takes a part in said relative rotation and causes an angular displacement of the auxiliary shaft 17 relative to the propeller shaft 8, thereby effecting an adjustment of the propeller blades relative to their hub.

It will be apparent that in the above described operations, the rotation of the propeller shaft 8 as driven by the motors 1 and 2, is transmitted by the gearwheels 22, 21, 19 and 18 to the adjusting shaft 17 and that the adjusting shaft 17 rotates under the influence of the controller 20, when the control action is constant, with the same speed as the shaft 8. In proportion to the increase or decrease of the number of revolutions of the shaft 8, the controller 20 so acts as to change the angle between the auxiliary shaft 17 and the propeller shaft 8 by means of the gearwheel 19, and hence the pitch of the propeller blades.

It will be understood that the controller 20 may be constructed in any other suitable manner, and that hereinabove described may be replaced by one electrically, hydraulically, or pneumatically actuated, and the same applies to the common driving gearing 3, 4, 5, 6 and 7.

Figure 2:
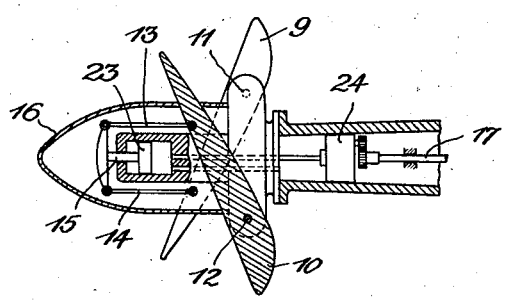
Figure 2 is a similar view on a smaller scale taken through another embodiment of the invention in which the pitch adjusting or control mechanism is pneumatically actuated.

In Figure 2 of the drawings is shown an embodiment of the invention in which a pneumatic or hydraulic arrangement is provided for operating the pitch adjusting mechanism, in which arrangement the shaft of the T-piece 15 is actuated by a hydraulic or pneumatic piston 23 to whose cylinder fluid under pressure is conveyed under the control of a controller 20 driven by means of a pump 24 drawn by the gearwheels 19, 18.

What we claim is:

1. In a driving mechanism for an aeroplane propeller having a hub, a propeller blade adjustably mounted on said hub, and a propeller shaft transmitting driving torque to said hub, the combination of a first gear wheel secured to the propeller shaft, a second gear wheel rotatable about a fixed axis and meshing with said first gear wheel, a third gear wheel rotatable about a fixed axis, coupling means between said second and third gear wheel to drive the latter normally at a speed equal to that of said second gear wheel and to effect angular displacements between said second and third gear wheel in dependence upon variations of a selected operating condition of the propeller, an auxiliary shaft carrying a fourth gear wheel in mesh with said third gear wheel to drive said auxiliary shaft at a rotary speed equal to that of the propeller shaft, and means to adjust the pitch position of the propeller blade relative to the hub in dependence upon angular displacements between said propeller shaft and said auxiliary shaft.

2. A driving mechanism, as claimed in claim 1, in which said coupling means between said second and third gear wheel is adapted to effect angular displacements between said second and third gear wheel in dependence upon variations in the speed of rotation of the propeller.

3. A driving mechanism, as claimed in claim 1, in which said coupling means between said second and third gear wheel is adapted to effect angular displacements between said second and third gear wheel in dependence upon variations of the torque transmitted by the propeller.

4. A driving mechanism, as claimed in claim 1, in which said second and third gear wheel are arranged on a common fixed axis.

5. A driving mechanism, as claimed in claim 1, in which the size of said first gear wheel is equal to the size of said fourth gear wheel and the size of said second gear wheel is equal to that of said third gear wheel whereby said auxiliary shaft rotates normally synchronously with the propeller shaft.

6. A driving mechanism, as claimed in claim 1, in which said means for adjusting the pitch of the propeller blade includes cooperating elements rotatable with said propeller shaft and said auxiliary shaft, respectively.

7. A driving mechanism, as claimed in claim 1, in which said means for adjusting the pitch of the propeller blade includes an axially displaceable element arranged for rotation with said hub, means connecting said element with the blade for adjustment of the latter relative to the hub upon axial displacement of said element, and a screw coupling between the auxiliary shaft and said element.

8. A driving mechanism, as claimed in claim 1, in which the propeller shaft is hollow and said auxiliary shaft projects axially into said hollow propeller shaft.

9. A driving mechanism, as claimed in claim 1, in which the propeller shaft is hollow and said auxiliary shaft is rotatably and coaxially supported in said hollow propeller shaft with its rear end projecting from the rear end of the latter, said first gear wheel being secured to the rear end of the hollow propeller shaft and said fourth gear wheel being secured to the rear end of said auxiliary shaft.

10. In a driving mechanism for an aeroplane propeller having a hub and a propeller blade adjustably mounted on said hub, the combination with a single hollow propeller shaft transmitting driving torque to said hub, a plurality of driving motors, drive gearing including a drive member secured to said hollow propeller shaft intermediate the ends thereof, and coupling means between each of said motors and said gearing, each of said coupling means being adapted to become inoperative if the torque transmitted from its associated motor to said propeller shaft becomes negative, of an auxiliary shaft rotatably and coaxially supported in said hollow propeller shaft with its rear end projecting from the rear end of the latter, coupling means between the rear end of the propeller shaft and the rear end of the auxiliary shaft to drive the auxiliary shaft normally at a speed equal to that of the propeller shaft and to effect angular displacements between said propeller shaft and auxiliary shaft in dependence upon variations of a selected operating condition of the propeller, and means to adjust the pitch position of the propeller blade relative to the hub in dependence upon said angular displacements between said propeller shaft and said auxiliary shaft.

FRITZ NALLINGER.
ALBERT FRIEDRICH.